United States Patent
Igarashi et al.

(10) Patent No.: US 6,635,367 B2
(45) Date of Patent: Oct. 21, 2003

(54) MAGNETIC RECORDING MEDIUM

(75) Inventors: Masukazu Igarashi, Kawagoe (JP); Fumiko Akagi, Fuchu (JP); Hideki Zaitsu, Kokubunji (JP); Futoshi Tomiyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 48 days.

(21) Appl. No.: 09/941,798

(22) Filed: Aug. 30, 2001

(65) Prior Publication Data
US 2002/0132140 A1 Sep. 19, 2002

(30) Foreign Application Priority Data

Mar. 19, 2001 (JP) ............................... 2001-077414

(51) Int. Cl.[7] ............................... G11B 5/66; G11B 5/70
(52) U.S. Cl. ................ 428/694 TM; 428/212; 428/694 TS; 428/900
(58) Field of Search ............... 428/694 TM, 212, 428/694 TS, 900; 360/97.01

(56) References Cited

U.S. PATENT DOCUMENTS 6,280,813 B1 * 8/2001 Carey et al. ............... 428/65.3
6,372,330 B1 * 4/2002 Do et al. ............... 428/212
6,383,668 B1 * 5/2002 Fullerton et al. .... 428/694 TM

FOREIGN PATENT DOCUMENTS

JP          6-96433          4/1994

* cited by examiner

Primary Examiner—Holly Rickman
(74) Attorney, Agent, or Firm—Antonelli, Terry, Stout & Kraus, LLP (57) ABSTRACT

An object is to provide a magnetic recording medium giving high resolution, low noise and little thermal fluctuation and thus suitable for high density magnetic recording, and a high-capacity magnetic recording device realized by using this medium. A thin film type magnetic recording medium is used, having at least 2 magnetic layers formed on a non-magnetic substrate and a non-magnetic intermediate layer that is interposed between the magnetic layers and causes the magnetizations of the magnetic layers to be anti-parallel to one another, and wherein the ratio HkB/HkA of the anisotropic magnetic field strength HkB of the magnetic layer on the side near to the substrate to the anisotropic magnetic field strength HkA of the magnetic layer on the side far from the substrate is 0.7 or less, more preferably at least 0.4 and not more than 0.65.

17 Claims, 9 Drawing Sheets transition width for a conventional mono-layer medium having same thickness as recording magnetic layer in present invention transition width for a conventional mono-layer medium having same effective thickness as multi-layered medium of present invention

MAGNETIC RECORDING MEDIUM

BACKGROUND OF THE INVENTION

1. Field of the Invention

The present invention relates to a magnetic recording device for a household electrical information device such as a digital VTR or a magnetic disk drive used in a computer, an information processing device or the like, and a magnetic recording medium thereof, and more particularly to a magnetic recording medium ideal for realizing high density recording and a magnetic recording device using this magnetic recording medium.

2. Description of the Related Art

Semiconductor memories, magnetic memories and the like are used in the storage (recording) devices of information equipment. From the viewpoint of high speed access, semiconductor memories are used in internal storage devices, whereas from the viewpoint of high capacity, low cost and nonvolatilty, magnetic memories are used in external storage devices. Magnetic memories are used mainly in magnetic disk drives, magnetic tapes and magnetic card drives. To write magnetic information onto the recording medium, i.e. the magnetic disk, magnetic tape, magnetic card or the like, a magnetic recording part that generates a strong magnetic field is used. Moreover, to play back magnetic information that has been recorded at high density, a playback part that makes use of the phenomenon of magneto-resistance or the phenomenon of electromagnetic induction is used. Recently, giant magneto-resistive effects and tunnel type magneto-resistive effects have also started to be studied. The above functional parts (the magnetic recording part and the playback part) are provided on an input/output component called a magnetic head.

Figure 10:
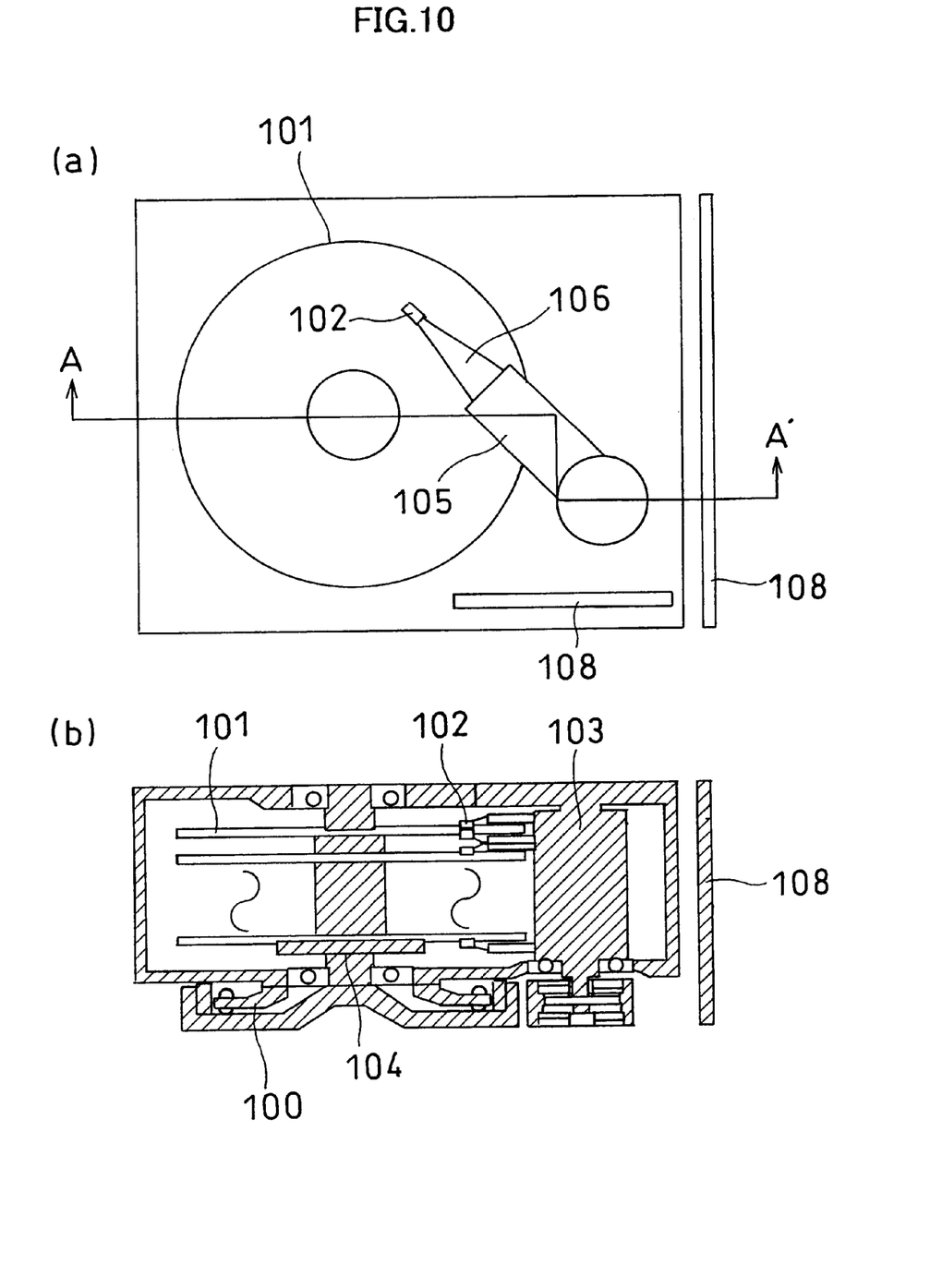
FIG. 10 shows conceptual diagrams of a magnetic disk drive.

FIG. 10 shows the basic constitution of a magnetic disk drive. FIG. 10(a) is a plan view of the drive, while FIG. 10(b) is a cross-sectional view along the line A—A' shown in FIG. 10(a). A recording medium 101 is fixed to a rotating bearing 104, and is rotated by a motor 100. FIG. 10 shows an example in which there are 5 magnetic disks and 10 magnetic heads (with 3 of the magnetic disks and 4 of the magnetic heads actually being depicted), but the number of magnetic disks and the number of magnetic heads may each be any number from 1 upwards. A magnetic head 102 moves across the surface of the rotating recording medium 101. The magnetic head 102 is supported by a rotary actuator 103 via an arm 105. A suspension 106 has a function of pushing the magnetic head 102 against the recording medium 101 with a prescribed load. Prescribed electrical circuits are needed for processing the playback signal and inputting and outputting information. PRML (partial response maximum likelihood) and EPRML (extended PRML) signal processing circuits that actively utilize waveform interference at high recording density have recently been introduced, and have contributed greatly to increased recording density. These circuits are installed in a case 108 or the like.

Figure 11:
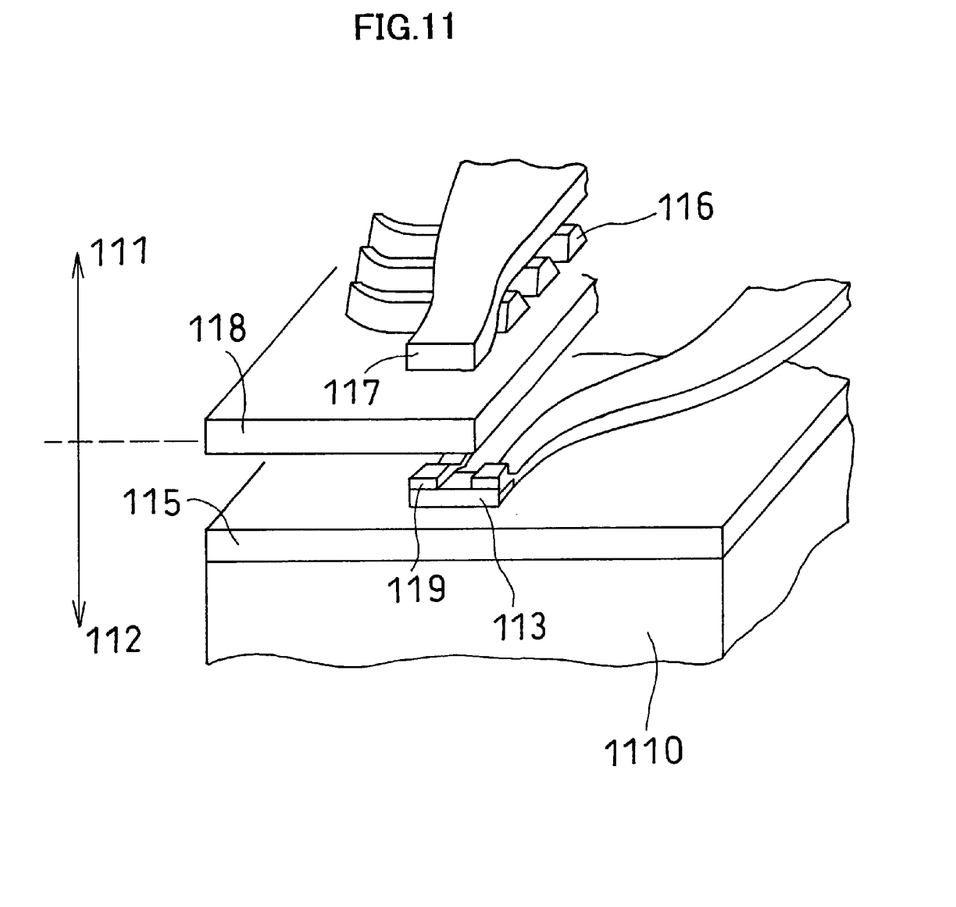
FIG. 11 is a conceptual diagram of a magnetic head.

The parts provided on the magnetic head for recording and playing back information have, for example, a constitution as shown in FIG. 11. The recording part 111 is composed of a spirally wound coil 116, and magnetic poles 117 and 118 that envelop the coil 116 from the top and bottom respectively and are magnetically coupled to the coil 116. The magnetic poles 117 and 118 are each composed of a patterned magnetic film. The playback part 112 is composed of a magneto-resistive effect element 113, and an electrode 119 for passing a constant current through the magneto-resistive effect element 113 and detecting changes in the resistance. The magnetic pole 118, which also serves as a magnetic shielding layer, is provided between the recording part 111 and the playback part 112. A shielding layer 115 is also provided below the magneto-resistive effect element 113. The shorter the length of the gap between the shielding layer 115 and the magnetic pole 118 (which also serves as a shielding layer), the higher the playback resolution. The functional parts described above are formed on top of a magnetic head slider 1110.

Figure 3:
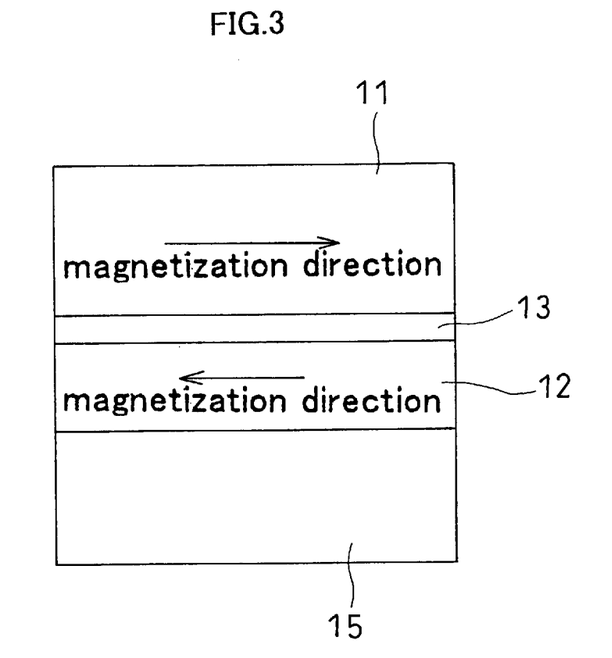
FIG. 3 is a conceptual diagram of an AFC medium.
Figure 4:
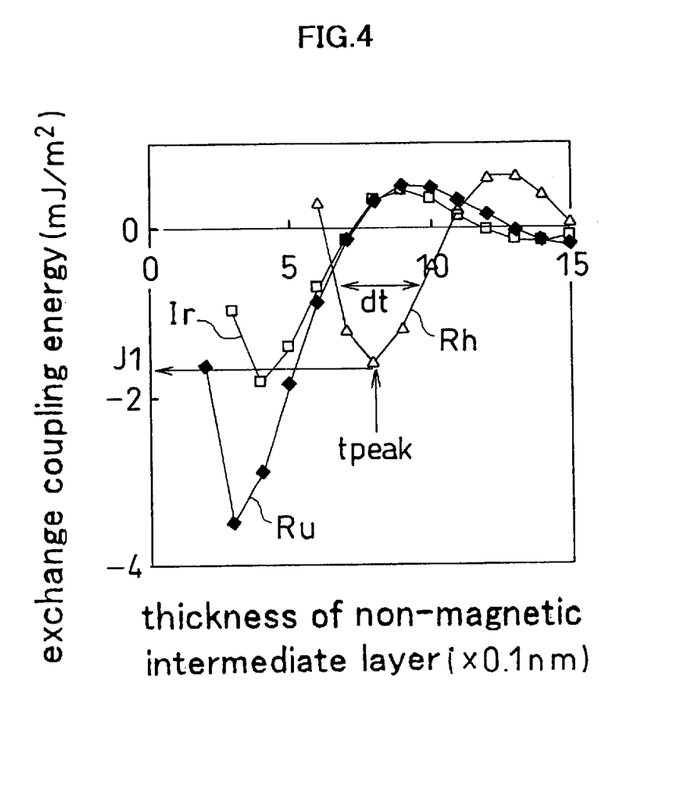
FIG. 4 is a conceptual diagram of antiferromagnetic coupling.

To make the magnetic disk drive have a large capacity, the magnetic information recorded on the recording medium 101 shown in FIG. 10 should be at high density. However, a conventionally used magnetic recording medium is composed of minute crystalline particles, and thus there is a problem that as the recording density is increased, the number of particles per bit becomes lower and hence noise increases. Attempts have thus been made to reduce noise by making the diameter of the magnetic particles lower, and promoting segregation by using a non-magnetic component at the boundaries between the magnetic particles to reduce the interactions between the magnetic particles. However, in recent years the recording density has been increased at a rate of over 50% per year, and attempts are now being made to carry out recording and playback at a surface recording density of about 15 Gb/in$^2$ or more, whereupon as the volume of the magnetic particles is reduced, decay of the recording magnetization due to thermal fluctuation (thermal demagnetization) becomes a serious problem. This is a phenomenon whereby the magnetization of the particles that make up the medium is reversed by heat, and becomes marked as the particle diameter is reduced to reduce noise. It is hoped that the influence of thermal fluctuation can be mitigated using the perpendicular magnetic recording method proposed by Iwasaki et al. Moreover, at the 2000 Intermag international conference, a longitudinal medium in which the magnetic layers are antiferromagnetically coupled through Ru (called an 'AFC medium') was proposed by Fujitsu and IBM as a way of enhancing thermal stability. However, with this newly proposed medium, the recording magnetic field becomes large, and it is thought that there is a high possibility that this will cancel out the merits of thermal stability enhancement. A description will now be given of the antiferromagnetically coupled (AFC) medium that forms the basis of the present invention, with reference to FIG. 3. FIG. 3 is a conceptual diagram of the cross-sectional structure of the medium. The medium comprises a magnetic underlayer 12 formed on top of a non-magnetic substrate 15, and a recording magnetic layer 11 formed via a non-magnetic intermediate layer 13. If Ru is used as the non-magnetic intermediate layer 13, then exchange coupling takes place between the recording magnetic layer 11 and the magnetic underlayer 12. The associated exchange coupling energy J varies in an oscillatory fashion with the thickness of the Ru non-magnetic intermediate layer 13 as shown in FIG. 4. Exchange coupling takes place such that the magnetization direction of the recording magnetic layer 11 and the magnetization direction of the magnetic underlayer 12 are anti-parallel to one another when the exchange coupling energy J takes a negative value, and are parallel to one another when the exchange coupling energy J takes a positive value. By setting the thickness of the Ru non-magnetic intermediate layer 13 such that the exchange coupling energy J is at the negative peak, the magnetization of the recording magnetic layer 11 and the magnetization of the magnetic underlayer 12 can thus be coupled antiferromagnetically (i.e. made to be anti-parallel to one another)

The product of the thickness and the residual magnetization of the recording magnetic layer 11 is made to be larger than the product of the thickness and the residual magnetization of the magnetic underlayer 12. For the sake of simplicity, assume that the recording magnetic layer 11 and the magnetic underlayer 12 have the same saturation magnetization Ms and the same magnetic anisotropy energy Ku, and let the particle volume for the recording magnetic layer 11 be v1 and the particle volume for the magnetic underlayer 12 be v2. When the antiferromagnetic coupling is sufficiently strong, the value of $K\beta = Ku*v/(k*T)$ (where K is Boltzmann's constant and T is the absolute temperature), which is a parameter the larger the value of which the larger the resistance to thermal fluctuation, will become $Ku(v1+v2)/(k*T)$, which is larger than the $K\beta$ value $Ku*v1/(k*T)$ of the recording magnetic layer 11 alone by the $K\beta$ value $Ku*v2/(k*T)$ of the magnetic underlayer 12, resulting in thermal stability. However, because the magnetization of the recording magnetic layer 11 and the magnetization of the magnetic underlayer 12 are anti-parallel to one another, the overall saturation magnetization will be effectively reduced to $Ms(v1-v2)/v1$, and the effective anisotropic magnetic field $(2*Ku/Ms)$ for determining the magnetic field required to reverse the magnetization will become $(2*Ku/Ms)*(v1+v2)/(v1-v2)$. It can thus be seen that the more v2 is increased to improve the thermal stability, the larger the magnetic field required to reverse the magnetization becomes. However, at the 2001 Intermag international conference, it was reported that with an AFC medium in which antiferromagnetic coupling is not very strong, the recording magnetic field does not become large. In this case, the effective $K\beta$ value of the medium is approximately the same as the $K\beta$ value of the recording magnetic layer. However, with this AFC medium for which the magnetic properties of the upper and lower layers are approximately the same, there is a deterioration in the R/W properties, and hence to obtain equivalent R/W properties the overall thickness must be reduced, whereupon the effect of improving the thermal demagnetization properties becomes very small. It is thus difficult to obtain both good thermal fluctuation properties and good R/W properties. A model has been reported in which, for an AFC medium in which antiferromagnetic coupling is not very strong, the magnetization direction of the recording magnetic layer 11 and the magnetization direction of the magnetic underlayer 12 become parallel to one another during recording.

SUMMARY OF THE INVENTION

An object of the present invention is to provide a magnetic recording medium giving high resolution, low noise and little thermal fluctuation and thus suitable for high density magnetic recording, and a high-capacity magnetic recording device realized by using this medium.

Figure 5:
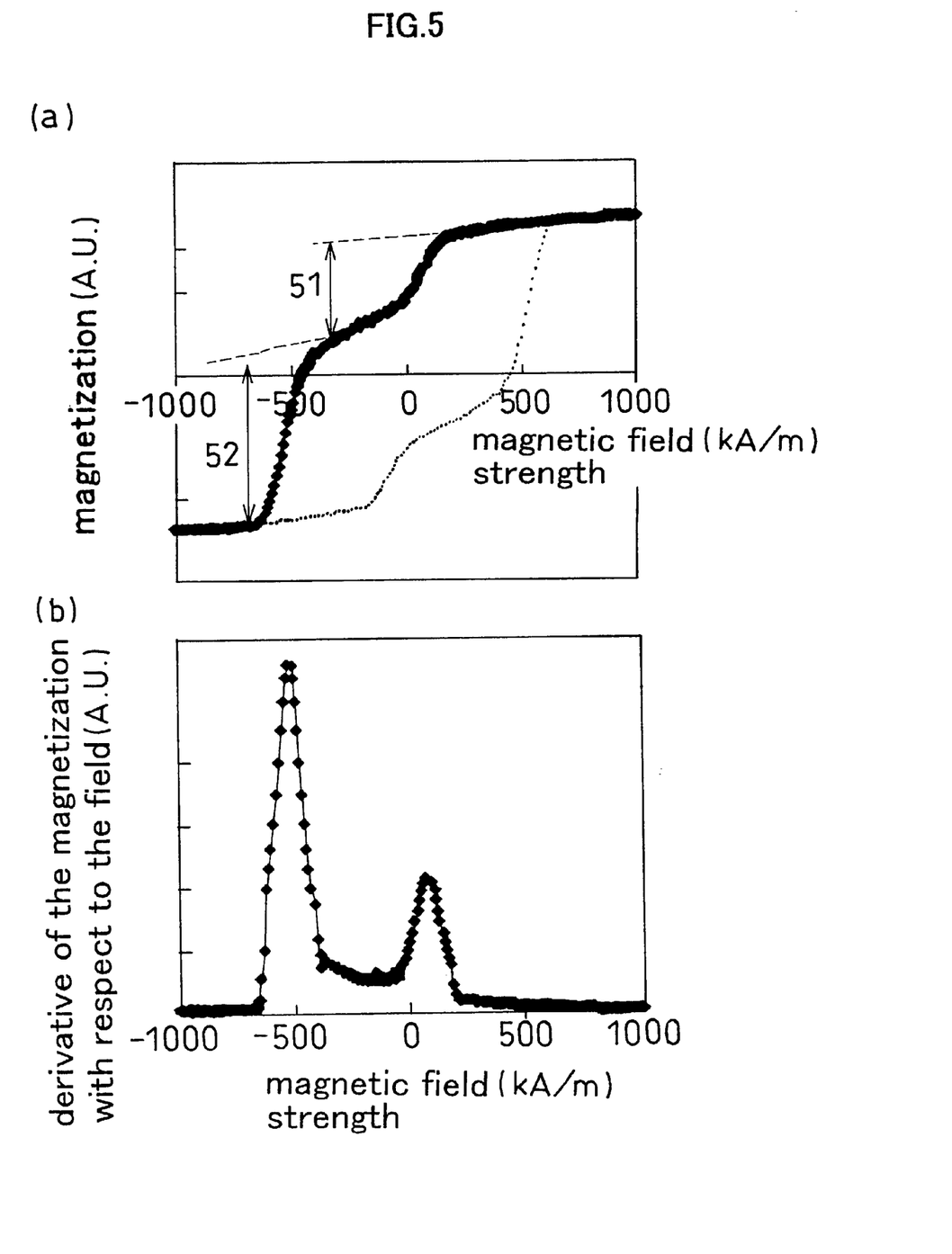
FIG. 5 shows a magnetization curve and the derivative thereof of the magnetic recording medium of the present invention.
Figure 6:
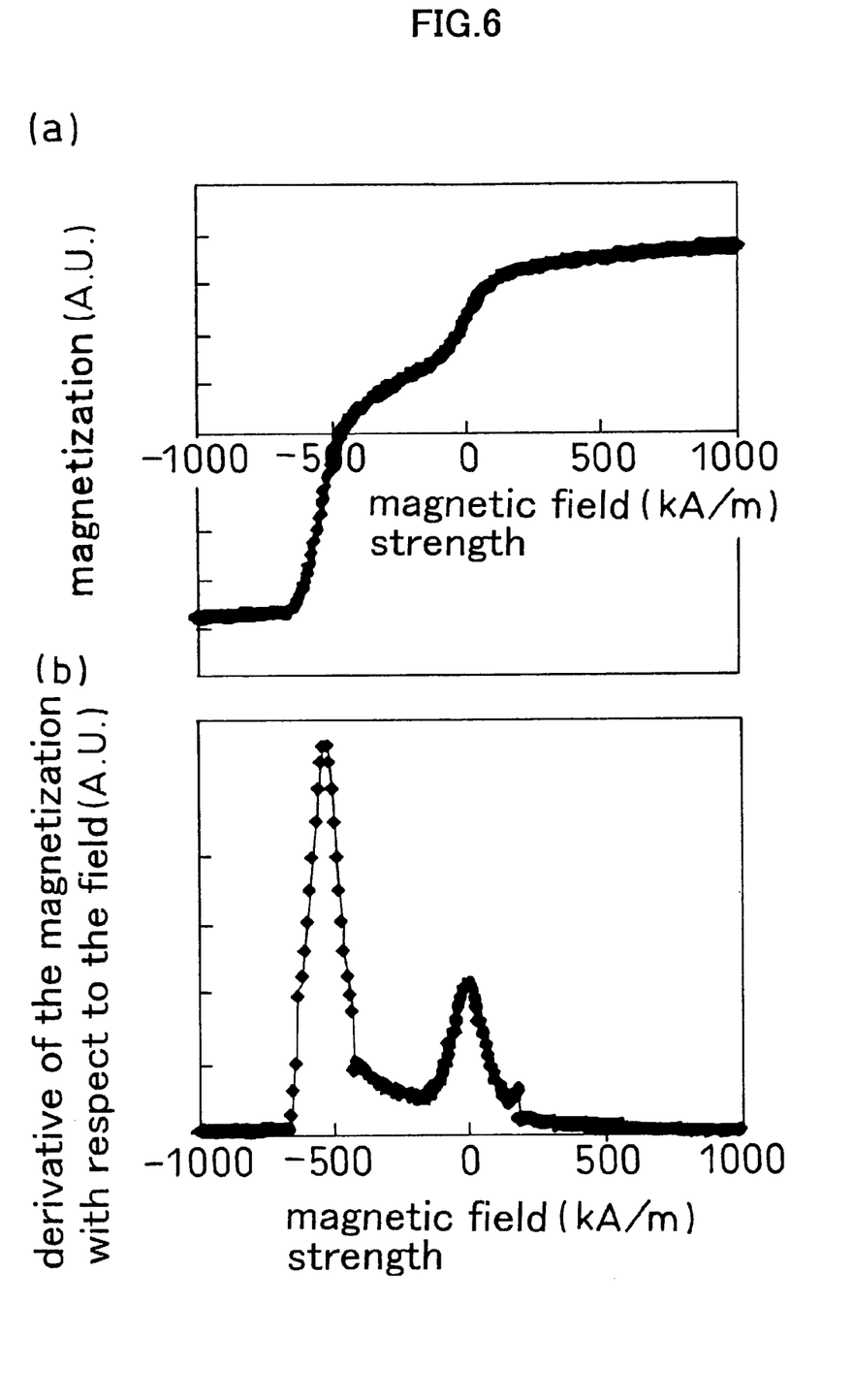
FIG. 6 shows another magnetization curve and the derivative thereof of the magnetic recording medium of the present invention.

To realize the above object, assiduous studies were carried out into the structure of the medium, materials, processes, and device-related art concerning heads and the like, and it was discovered that the undermentioned means are extremely effective. The process of rearrangement after recording is important in understanding the properties of the medium. This is a process in which the magnetization direction of the recording magnetic layer 11 and the magnetization direction of the magnetic underlayer 12, which were approximately parallel to one another immediately after the recording, become anti-parallel to one another due to reversal caused by thermal fluctuation. The reversal caused by thermal fluctuation is a probabilistic process, and a finite time is required for most of the particles to complete rearrangement and for a pair of anti-parallel magnetizations to be realized in the upper and lower layers. If the rearrangement is incomplete, then the residual magnetization will be too large, and there will be a deterioration in the playback resolution and the thermal demagnetization will also increase. The track direction, which is the direction of movement of the magnetic head that records on the AFC medium relative to the AFC medium, is such that approximate magnetization is recorded in the case of normal longitudinal recording. It has been observed that, during the process in which a magnetic field is applied in the track direction to cause magnetic saturation, then the magnetic field is reduced, and then a magnetic field is applied in a direction opposite to the track direction to cause magnetic saturation (the M-H loop), the magnetization reverses at different magnetic field strengths for each of the laminated magnetic layers. FIG. 5(a) shows an example of an M-H loop for an AFC medium comprising 2 magnetic layers as measured when the magnetic field strength was reduced at a rate of 300A/m per second. In FIG. 5(a), the horizontal axis shows the magnetic field strength, with a positive value indicating a magnetic field in the track direction. The dotted line shows a process in which a magnetic field is applied in a direction opposite to the track direction until magnetic saturation is reached, and then the magnetic field is increased until magnetic saturation is once again reached at a large magnetic field in the track direction. It can be seen that there are two major changes while changing from a large positive magnetic field to a large negative magnetic field. The first change occurs at a small positive magnetic field, and since the amount of change in the magnetization is smaller than for the other change in the magnetization, it is thought that this corresponds to the reversal of the magnetization of the magnetic underlayer. The other change in the magnetization occurs at a large negative magnetic field and is thought to correspond to the reversal of the magnetization of the recording magnetic layer. FIG. 5(b) shows the derivative of the M-H loop shown by the full line in FIG. 5(a) with respect to the magnetic field strength. Peaks can be seen in FIG. 5(b) corresponding to the two magnetization reversals. In the example of FIG. 5, in the residual state when the magnetic field strength is zero, the change in the magnetization accompanying the reversal of the magnetization of the magnetic underlayer has disappeared, and hence it is thought that the rearrangement is complete. FIGS. 6(a) and (b) are like FIGS. 5(a) and (b), only showing respectively the M-H loop of the AFC medium as measured when the magnetic field strength was reduced at a rate of 30,000A/m per second and the derivative thereof with respect to the magnetic field strength. It can be seen that in FIG. 6 the magnetic field strength at which the magnetization of the magnetic underlayer reverses has shifted almost to zero. It is thought that this is because, since the rate of change of the magnetic field strength is higher, the timing at which the magnetization of the magnetic underlayer reverses is later. In contrast, there is little change in the magnetic field strength at which the magnetization of the recording magnetic layer reverses. If the reversal of the magnetization of the magnetic underlayer occurs probabilistically through thermal fluctuation, then the reason for the above is easy to understand. In actual fact, even at a rate of reducing the magnetic field strength of 300A/m per second, by reducing the measurement temperature by about 60 degrees, an M-H loop almost the same as that of FIG. 6 could be obtained. In FIG. 6, in the residual state when the magnetic field strength is zero, the reversal of the magnetization of the magnetic underlayer is only half complete. In this state, the residual magnetization is large, and is still changing with time. If measurements are taken with a yet higher rate of change of the magnetic field strength than in the case of FIG. 6 or at a yet lower temperature, then the magnetic field strength at which the magnetization of the magnetic underlayer reverses shifts to a minus value. From the above, it was concluded that: 1) by investigating the M-H loop of the AFC medium and the derivative thereof with respect to the magnetic field strength, an understanding of the situation regarding rearrangement can be obtained; and 2) even if the magnetic field strength sweeping rate while measuring the M-H loop is kept constant, a measurement temperature still exists for which the M-H loop is approximately the same as if the magnetic field strength sweeping rate had been changed.

Considering that in a magnetic disk drive the time taken for the disk to rotate once immediately after recording and for the playback operation to begin is about 10 milliseconds, studies were carried out on various AFC media into the conditions under which reversal of the magnetization of the magnetic underlayer and rearrangement are completed within this time. As a result, it was found that in the case that the magnetic field strength is changed at a rate of 3,000A/m per second, if the M-H loop is measured at 135K and the derivative of the M-H loop with respect to the magnetic field strength is taken, then the magnetic field strength at which there is a peak corresponding to the reversal of the magnetization of the magnetic underlayer should be zero or a positive value. For every factor of 10 by which the magnetic field strength sweeping rate is increased, the measurements should be taken at a temperature about 3.0 degrees higher.

As described above, to realize a high-capacity magnetic recording device that uses an AFC medium, it is necessary to control not only the recording and playback processes and the heat resistance properties, which are considered with conventional media, but also the rearrangement process.

A thin film type magnetic recording medium having at least 2 magnetic layers formed on a non-magnetic substrate and a non-magnetic intermediate layer that is interposed between the magnetic layers and causes the magnetizations of the magnetic layers be anti-parallel to one another has the structure of an AFC medium. The magnetic layer on the side near to the substrate is made to be the magnetic underlayer, and the magnetic layer on the side far from the substrate is made to be the recording magnetic layer. The product of the thickness and the residual magnetization of the recording magnetic layer is made to be larger than the product of the thickness and the residual magnetization of the magnetic underlayer. The size of the residual magnetization of each of the magnetic layers is preferably made to be about half of the size of the change in the magnetization corresponding to the magnetic layer in question in FIG. 5. The value obtained by subtracting the product of the thickness and the residual magnetization of the magnetic underlayer from the product of the thickness and the residual magnetization of the recording magnetic layer and then dividing by the residual magnetization of the recording magnetic layer has the units of length, and is often used as the effective thickness of the AFC medium when comparing with a mono-layer medium. The size of the effective thickness is determined in accordance with the amount of residual magnetization, the sensitivity of the playback head, and the track width. The non-magnetic substrate comprises glass, NiP-plated Al, a ceramic, Si, a plastic or the like in the form of a disk of diameter 3.5, 2.5, 1.8, 1 inches or the like, a tape or a card. A non-magnetic layer such as a Cr, Mo, W, CrMo, CrTi, CrCo, NiCr, Ta, CoCr, Ge or TiNb layer, a non-magnetic CoCr/CrTi laminated ground layer or a non-magnetic CoCrTa/CrTi/Cr laminated ground layer, containing at least 50 at % of at least one element selected from the group consisting of Cr, Mo, W, Ta, V, Nb, Ti, Ge, Si, Co and Ni, is formed on the surface of the non-magnetic substrate, thus allowing the crystal grain diameter, orientation and the like of the magnetic underlayer and the recording magnetic layer to be controlled. From the standpoint of increasing the degree of freedom of control, and in particular reducing thermal fluctuation and so on, it is further preferable to form a plurality of such non-magnetic layers on the surface of the non-magnetic substrate. A crystalline magnetic material such as a Co—Cr—Pt, Co—Cr—Pt, Co—Pt, Fe—Co—Ni alloy or the like conventionally used as a magnetic recording medium, containing at least 50 at % of at least one metallic element selected from the group consisting of Co, Fe and Ni, is preferably used as the recording magnetic layer. Note, however, that because the thickness must be made greater than that of a conventional medium having a single magnetic layer, it is necessary to take care that enlargement of the particle diameter is suppressed and that intra-particle exchange coupling is not reduced.

If the product of the thickness and the residual magnetization of the magnetic underlayer is held constant, then the larger the saturation magnetization of the magnetic underlayer, the thinner the magnetic underlayer can be made, which contributes greatly to reduction of the transition width in the recording process as described in more detail below. By using either Co or an alloy having Co as a principal component and also containing at least one element selected from Fe, Ni, Cr, Ta, Pt and Pd as the magnetic underlayer, a magnetic layer having a crystalline structure the same as that of the recording magnetic layer and the required magnetic anisotropy can be formed. If the magnetic underlayer contains B (boron), then the magnetic particle diameter is lowered and the noise reduction effect becomes marked.

If Ru, or Ir, Rh, Re, Cu or Cr, is used in the non-magnetic intermediate layer, then the adjacent magnetic layers can be coupled together antiferromagnetically. It is thought that Ru is capable of increasing the antiferromagnetic coupling field, as described in publicly known examples. However, Ru is a platinum group element and thus has high affinity for Pt, and hence it may not be possible to obtain a large antiferromagnetic coupling field if an alloy containing Pt such as CoCrPt or CoCrPtB is used as a magnetic layer. To control the antiferromagnetic coupling field, it is necessary to vary the Pt content in the magnetic layer or the Pt content at the interface of the magnetic layer with the non-magnetic intermediate layer. Moreover, using a material having a large saturation magnetization as the magnetic layer is also an effective way of increasing the antiferromagnetic coupling field. The antiferromagnetic coupling field is sensitive to the state of the interface between the magnetic material and the non-magnetic intermediate layer, and is thus greatly affected by the film formation conditions. In particular, a large antiferromagnetic coupling field is obtained with the RF sputtering method. The antiferromagnetic coupling field obtained with the DC sputtering method is about ⅓ of that obtained with the RF sputtering method, but is still about double that obtained with the MBE method. The method used for forming the intermediate layer should be such that the required coupling field is obtained. If Ir, Rh or Re is used as the non-magnetic intermediate layer, then the antiferromagnetic coupling field will be somewhat smaller than when Ru is used, but the cost will be lower, and hence use of Ir, Rh or Re is suited to mass production. Ir and Rh are platinum group elements, and hence when using an alloy containing Pt such as CoCrPt or CoCrPtB as a magnetic layer, to control the antiferromagnetic coupling field, it is necessary to vary the Pt content in the magnetic layer or the Pt content at the interface of the magnetic layer with the non-magnetic intermediate layer. Rh and Cu are metals that have good ductility and malleability, and moreover the thickness at which the antiferromagnetic coupling field is a maximum is about double that for Ru, Ir and Re at about 0.8 nm, and hence if Rh or Cu is used then a high quality medium having uniform magnetic properties can be obtained, with there being little fluctuation across the disk surface in the antiferromagnetic coupling field due to unevenness in the thickness, pinholes or the like. Moreover, for Ru, Ir and Re, the thickness range over which an antiferromagnetic coupling field can be obtained is broad compared with the average, and hence Ru, Ir and Re are excellent in terms of process management. If Cu or Cr is used as the non-magnetic intermediate layer, then lattice matching with a Co alloy magnetic layer is good, and hence crystallinity and orientation of the recording magnetic layer are improved. If Cr is used, then it is preferable for a magnetic layer in contact with the non-magnetic intermediate layer or the surface thereof to contain Fe, since then a large antiferromagnetic coupling field can be obtained. Ru, Ir, Rh, Re, Cu, Cr, or an alloy containing at least 50 at % of at least one element selected from Ru, Ir, Rh, Re, Cu and Cr is preferably used as the non-magnetic intermediate layer of a weakly-coupled AFC medium. In particular, if an alloy containing at least one element selected from Ru, Ir and Rh and at least one element selected from Pt and Pd is used, then the antiferromagnetic coupling energy can be freely and stably controlled within a broad range of 0 to 5 mJ/m$^2$ by controlling the alloy composition. This is because Pt and Pd give no antiferromagnetic coupling (J=0), and Ru, Ir, Rh, Pt and Pd are all platinum group elements and thus have high affinity for one another, and hence the constituent elements of the alloy are uniformly mixed together even over a minute region. Ru, Ir, Rh, Cr, or an alloy containing at least one element selected from Ru, Ir, Rh, and Cr is preferably used as the non-magnetic intermediate layer of a strongly-coupled AFC medium. If Cr is used, then it is preferable for a magnetic layer in contact with the non-magnetic intermediate layer or the surface thereof to contain Fe, since then a large antiferromagnetic coupling field can be obtained.

Ferromagnetic resonance is preferably used to measure the anisotropic magnetic field of each of the magnetic layers in the AFC medium. By applying a magnetic field perpendicular to the film surface, the anisotropic magnetic field strength Hk of a medium having a longitudinal axis of magnetic anisotropy can be measured (J. Appl. Phys., Vol. 85, No. 8, 4720 (1999)). Letting the resonance frequency be f, the gyromagnetic ratio be γ, and the saturation magnetic flux density of the magnetic layer be Bs, Hk of the magnetic layer in question can be obtained from the resonance magnetic field strength Hr using the following equation.

$$(2\pi f/\gamma)^2=(Hr-Bs)(Hr-Bs-Hk)$$

If the magnetic transition width of an isolated transition is observed using a magnetic force microscope (MFM), it is found that the magnetic transition width changes in accordance with the ratio HkB/HkA of the anisotropic magnetic field strength HkB of the magnetic under layer of the AFC medium to the anisotropic magnetic field strength HkA of the recording magnetic layer. Comparing with a mono-layer longitudinal medium, it is undesirable for the ratio HkB/HkA to exceed 0.7, since then the magnetic transition width will become wider than that of a mono-layer longitudinal medium of thickness the same as that of the recording magnetic layer. Moreover, if the ratio HkB/HkA is between 0.4 and 0.65, then a magnetic transition width about as steep as that of a mono-layer longitudinal medium having the same effective thickness is obtained.

Figure 7:
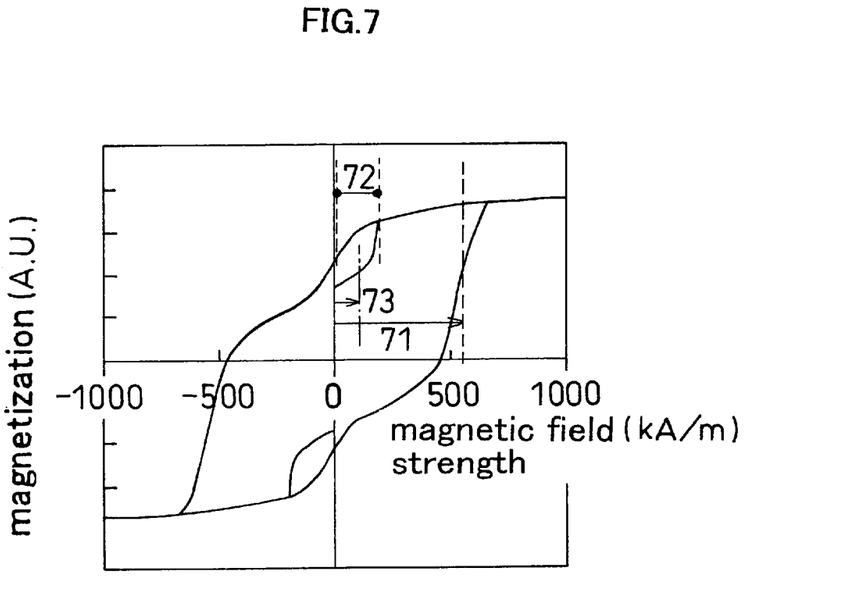
FIG. 7 is a diagram defining the magnetic properties of the magnetic recording medium of the present invention.
Figure 8:
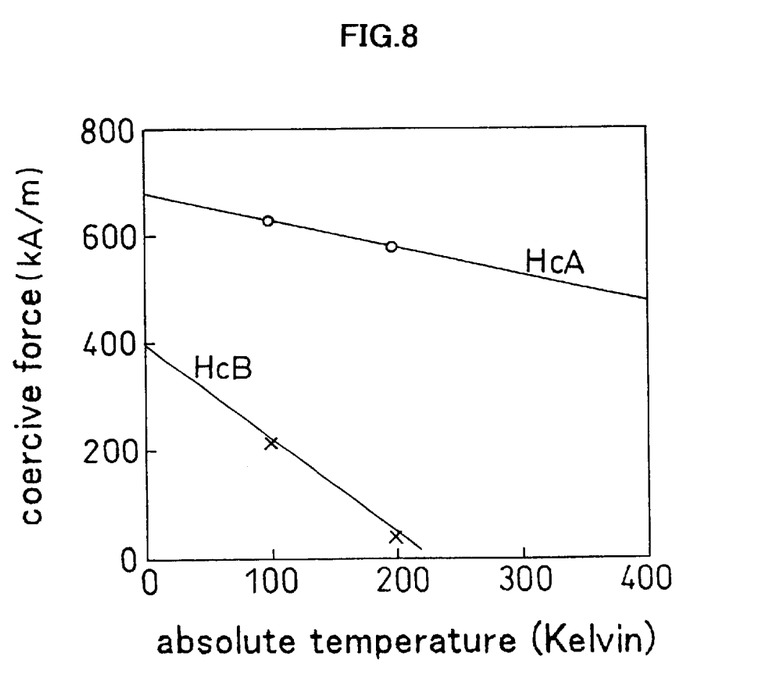
FIG. 8 is a diagram showing the change with temperature of the coercivity of each magnetic layer in the magnetic recording medium of the present invention.

For the case of the magnetization curve shown in FIG. 6, the direction of the change in the magnetic field strength was reversed at the stage (magnetic field strength) where the reversal of the magnetization of the magnetic underlayer had just been completed, thus forming a minor loop, as shown in FIG. 7. It can be seen from FIG. 7 that the magnetic underlayer shows hysteresis. The minor loop is shifted in the direction of positive magnetic field strength. The magnetic field strength in the center of the minor loop is generally called the antiferromagnetic coupling field strength HexB. The size J of the antiferromagnetic exchange coupling between the recording magnetic layer and the magnetic underlayer is estimated by HexB/(MsB*tB), wherein MsB and tB are the saturation magnetization and the thickness of the magnetic underlayer respectively. Moreover, half the span of the minor loop in the magnetic field strength direction is considered to be the coercivity of the magnetic underlayer. Half the span of the major loop in the magnetic field strength direction is the coercivity of the recording magnetic layer. Thermal fluctuation is greater for the magnetic underlayer than for the recording magnetic layer, and hence the coercivity of the magnetic underlayer changes greatly upon changes in measurement temperature. FIG. 8 shows the change with temperature in the coercivities of the recording magnetic layer and the magnetic underlayer. The coercivity changes approximately linearly with temperature, and so the approximate value of the coercivity at 0K can be obtained by joining the values at 200K and 100K with a straight line and extrapolating. In these measurements, the coercivity values at 200k and 100k vary according to the magnetic field strength sweeping rate, but the estimated value for 0k does not change. This estimated value was about 40% of the previously mentioned anisotropic magnetic field strength. The behavior of the magnetic transition width versus the ratio HcoB/HcoA of the coercivity HcoB of the magnetic underlayer at 0k to the coercivity HcoA of the recording magnetic layer at 0k is similar to that versus the anisotropic magnetic field strength ratio HkB/HkA.

To investigate the mechanism of the magnetic transition width improvement effect, a micro-magnetism simulation was carried out. When the improvement effect is large, the position of the magnetic transition formed in the magnetic underlayer, which has a low magnetic anisotropy, is further to the back of the head than the transition position in the recording magnetic layer, thus showing that the head magnetic field in the transition position in the recording magnetic layer is modulated by the magnetic field from the magnetic transition in the magnetic underlayer, and hence the magnetic field gradient dH/dx becomes steep. As the difference between the transition position in the recording magnetic layer and the transition position in the magnetic underlayer approaches the magnetic transition width or less, this effect rapidly disappears. When the value of (HcoA−HcoB)/(πa*dH/dx) is less than 0.8, the magnetic field from the magnetic transition in the magnetic underlayer acts in reverse, and the magnetic transition width rises rapidly. When the value of (HcoA−HcoB)/(πa*dH/dx) is between 0.9 and 1.5, a head magnetic field gradient of sufficient steepness is obtained. When the value of (HcoA−HcoB)/(πa*dH/dx) is greater than 1.5, the difference between the transition position in the recording magnetic layer and the transition position in the magnetic underlayer is too big and the head magnetic field hardly changes.

The magnetic anisotropy energy Ku can either be calculated from the relationship Hk=2*Ku/Ms, or using the relationship Kβ=Ku*v/(kT) from the Kβ value obtained by obtaining the pulse time dependency of the residual coercivity using VSM measurement or the reverse DC demagnetization method and fitting into Sharock's equation.

If the ratio KuB/KuA of the magnetic anisotropy energy KuB of the magnetic underlayer to the magnetic anisotropy energy KuA of the recording magnetic layer is greater than 0.7, then the resolution becomes worse than that of a conventional medium having a recording magnetic layer as the only magnetic layer. If the ratio KuB/KuA is between 0.4 and 0.65, then a resolution on a par with that of a conventional medium having about the same effective thickness is obtained. The Kβ value of the AFC medium in this case can be made 30% or more larger than that of a conventional medium having about the same effective thickness.

The improvement in the R/W properties of the AFC medium resulting from optimizing the magnetic anisotropies as described above presupposes a parallel arrangement of the recording magnetic layer and the magnetic underlayer through weak antiferromagnetic coupling. In the situation that rearrangement is completed within a few nanoseconds, a sufficient improvement effect will not be obtained. When the magnetic field strength is reduced at a rate of 3,000A/m per second at 30k, and the derivative of the M-H loop thus measured is taken with respect to the magnetic field strength and the peaks obtained, it is necessary for the peak corresponding to the reversal of the magnetization of the magnetic underlayer to be at a minus value.

Play back of recorded magnetic information is carried out by combining with a magnetic head having a playback element that uses a giant magneto-resistive effect element or a tunnel-coupled film exhibiting a magneto-resistive effect and has an effective track width of 0.5 μm or less. Help is received from the signal processing method, and hence a device S/N of at least the 20 dB required for operation of the device is obtained. By combining with EPRML, EEPRML, a trellis code, ECC or the like, recording and playback at a surface recording density of 40 Gb/in$^2$ or more is possible. For the recording part, it is preferable to use a head that uses magnetic poles having a saturation magnetic flux density of at least 1.8T, since then it becomes possible to use a recording magnetic layer material having a larger magnetic anisotropy. Art relating to giant magneto-resistive effect elements (GMR) and tunnel type magnetic heads is disclosed in Japanese Patent Application Laid-open No. S61-097906, Japanese Patent Application Laid-open No. H2-61572, Japanese Patent Application Laid-open No. H4-358310, Japanese Patent Application Laid-open No. H7-333015, and Japanese Patent Application Laid-open Nos. H2-148643 and H2-218904. An effective track width of 0.5 μm or less was realized using KrF stepper lithography or FIB processing.

DESCRIPTION OF THE PREFERRED EMBODIMENTS

The present invention will now be described in detail through embodiments and comparative examples.

Embodiments

Figure 2:
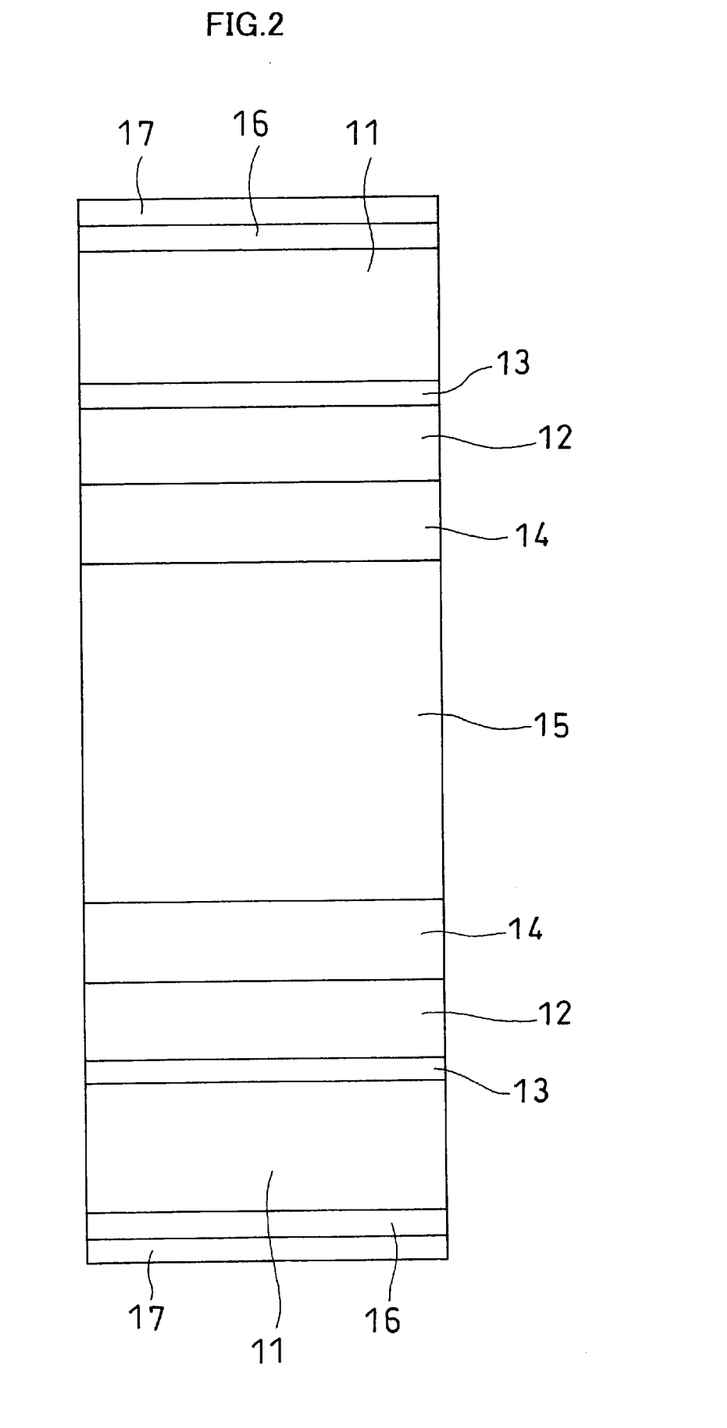
FIG. 2 is a conceptual diagram of principal parts of the magnetic recording medium of the present invention.

Following is a description of a first embodiment of the present invention with reference to FIG. 2. FIG. 2 is a conceptual diagram of a magnetic disk to which the present invention has been applied. For the sake of simplicity, only the structure of the top half in FIG. 2 will be described; the bottom half has the same structure. 15 is a non-magnetic substrate comprising glass, NiP-plated Al, a ceramic, Si, a plastic or the like in the form of a disk of diameter 3.5, 2.5, 1.8, 1 inches or the like, a tape or a card. A recording magnetic layer 11 comprises a crystalline magnetic material such as CoCrPt, CoCrTa, CoNiPt, CoPt—SiO$_2$, FeNiCo, CoFeTa, NiTa, CoW, CoNb, GdFeCo, GdTbFeCo, Fe—N, Co—CoO or the like containing at least 50 at % of at least one metallic element selected from the group consisting of Co, Fe and Ni. A non-magnetic ground layer 14 comprises Cr, Mo, W, CrMo, CrTi, CrCo, NiCr, Ta, CoCr, TiCr, Ge, TiNb or the like containing at least 50 at % of at least one element selected from the group consisting of Cr, Mo, W, Ta, V, Nb, Ti, Ge, Si, Co and Ni. A magnetic underlayer 12 comprises a crystalline magnetic material such as CoCrPt, CoCrTa, CoNiPt, CoPt—SiO$_2$, FeNiCo, CoFeTa, NiTa, CoW, CoNb, GdFeCo, GdTbFeCo, Fe—N, Co—CoO or the like containing at least 50 at % of at least one metallic element selected from the group consisting of Co, Fe and Ni. 16 is a protective overcoat comprising N-added C, H-added C, BN, ZrNbN or the like. 17 is a lubricant, such as a perfluoroalkylpolyether having an adsorptive or reactive terminal group such as OH or NH$_2$, or a metal salt of a fatty acid. A non-magnetic intermediate layer 13 comprises an alloy containing at least 50 at % of at least one metallic element selected from the group consisting of Ru, Ir, Rh, Re, Cu, Cr and Al, or an alloy containing a total of at least 50 at % of at least one element selected from Ru, Ir and Rh and at least one element selected from Pt and Pd. A second non-magnetic ground layer having a composition adjusted such that matching of the lattice constant to the magnetic layer is easier to obtain may also be provided between the magnetic underlayer 12 and the non-magnetic ground layer 14. Moreover, if a material containing little Pt is used between the non-magnetic intermediate layer and either one or both of the magnetic layers then the antiferromagnetic coupling is stabilized, and if a material having a large saturation magnetization is used then the coupling becomes stronger.

By using either Co or an alloy having Co as a principal component and also containing at least one element selected from Fe, Ni, Cr, Ta, Pt and Pd as the magnetic underlayer, a magnetic layer having a crystalline structure the same as that of the recording magnetic layer and the required magnetic anisotropy can be formed. If the magnetic underlayer contains B (boron), then the magnetic particle diameter is lowered and the noise reduction effect becomes marked.

Here, the ground layer(s), the magnetic layers and the non-magnetic intermediate layer were all formed on the substrate 15 using Ar gas at low pressure. The equipment used was such that the parameters for the ground layer(s) and the magnetic layers could be changed independently. With the equipment used, the Ar pressure was made to be 1 to 10 mTorr, the substrate temperature 100 to 300° C., and the film formation rate 0.1 to 1 nm/s. Either a single ground layer was used, or else two different ground layers; each ground layer comprised Cr, Ta, Nb, V, Si or Ge, or an alloy such as Co60-Cr40, Mo90-Cr10, Ta90-Cr10, Ni50-Cr50, Cr90-V10, Cr90-Ti10, Ti95-Cr5, Ti85-Ta15, Ti85-Nb15, Ti80-Pd20 or Ti85-Pt15. Samples having different ground layer compositions were prepared. The total ground layer thickness was from 10 to 100 nm, the thickness of each magnetic layer of CoCrPt, CoCrPt(Ta,V) or the like from 10 to 100 nm, and the thickness of the protective overcoat 10 nm. The Cr content of the Co alloy recording magnetic layer was made to be from 19 to 23 at %, the Pt content from 4 to 20 at %, and the V/Ta content from 2 to 5 at %. The thickness, saturation magnetization and anisotropic magnetic field of the recording magnetic layer were changed within the ranges 12 to 22 nm, 0.3 to 0.7T and 500 to 1200 kA/m respectively. The thickness, saturation magnetization and anisotropic magnetic field of the magnetic underlayer were changed within the ranges 1 to 8 nm, 0.3 to 1.5T and 100 to 1200 kA/m respectively.

If Ir, or Rh, Re, Cu or Cr, is used in the non-magnetic intermediate layer, then the adjacent magnetic layers can be coupled together antiferromagnetically. It is thought that Ru is capable of increasing the antiferromagnetic coupling field, as described in publicly known examples. However, Ru is a platinum group element and thus has high affinity for Pt, and hence it may not be possible to obtain a large antiferromagnetic coupling field if an alloy containing Pt such as CoCrPt or CoCrPtB is used as a magnetic layer. To control the antiferromagnetic coupling field, it is necessary to vary the Pt content in the magnetic layer or the Pt content at the interface of the magnetic layer with the non-magnetic intermediate layer. Moreover, using a material having a large saturation magnetization as the magnetic layer is also an effective way of increasing the antiferromagnetic coupling field. The antiferromagnetic coupling field is sensitive to the state of the interface between the magnetic material and the non-magnetic intermediate layer, and is thus greatly affected by the film formation conditions. In particular, a large antiferromagnetic coupling field is obtained with the RF sputtering method. The antiferromagnetic coupling field obtained with the DC sputtering method is about ⅓ of that obtained with the RF sputtering method, but is still about double that obtained with the MBE method. The method used for forming the intermediate layer should be such that the required coupling field is obtained. If Ir, Rh or Re is used as the non-magnetic intermediate layer, then the antiferromagnetic coupling field will be somewhat smaller than when Ru is used, but the cost will be lower, and hence use of Ir, Rh or Re is suited to mass production. Ir and Rh are platinum group elements, and hence when using an alloy containing Pt such as CoCrPt or CoCrPtB as a magnetic layer, to control the antiferromagnetic coupling field, it is necessary to vary the Pt content in the magnetic layer or the Pt content at the interface of the magnetic layer with the non-magnetic intermediate layer. Rh and Cu are metals that have good ductility and malleability, and moreover the thickness at which the antiferromagnetic coupling field is a maximum is about double that for Ru, Ir and Re at about 0.8 nm, and hence if Rh or Cu is used then a high quality medium having uniform magnetic properties can be obtained, with there being little fluctuation across the disk surface in the antiferromagnetic coupling field due to unevenness in the thickness, pinholes or the like. Moreover, for Ru, Ir and Re, the thickness range over which an antiferromagnetic coupling field can be obtained is broad compared with the average, and hence Ru, Ir and Re are excellent in terms of process management. If Cu or Cr is used as the non-magnetic intermediate layer, then lattice matching with a Co alloy magnetic layer is good, and hence crystallinity and orientation of the recording magnetic layer are improved. If Cr is used, then it is preferable for a magnetic layer in contact with the non-magnetic intermediate layer or the surface thereof to contain Fe, since then a large antiferromagnetic coupling field can be obtained. Ru, Ir, Rh, Re, Cu, Cr, or an alloy containing at least 50 at % of at least one element selected from Ru, Ir, Rh, Re, Cu and Cr is preferably used as the non-magnetic intermediate layer of a weakly-coupled AFC medium. In particular, if an alloy containing at least one element selected from Ru, Ir and Rh and at least one element selected from Pt and Pd is used, then the antiferromagnetic coupling energy can be freely and stably controlled within a broad range of 0 to 5 mJ/m$^2$ by controlling the alloy composition. This is because Pt and Pd give no antiferromagnetic coupling (J=0), and Ru, Ir, Rh, Pt and Pd are all platinum group elements and thus have high affinity for one another, and hence the constituent elements of the alloy are uniformly mixed together even over a minute region. Ru, Ir, Rh, Cr, or an alloy containing at least one element selected from Ru, Ir, Rh, and Cr is preferably used as the non-magnetic intermediate layer of a strongly-coupled AFC medium. If Cr is used, then it is preferable for a magnetic layer in contact with the non-magnetic intermediate layer or the surface thereof to contain Fe, since then a large antiferromagnetic coupling field can be obtained.

A medium as described above was installed in a magnetic disk drive according to the present invention as shown in FIG. 10, and evaluation was carried out. The magnetic disk drive uses a magnetic head comprising a magnetic head element formed on an Al$_2$O$_3$—TiC slider of size 1.0 mm*0.8 mm*0.2 mm. The magnetic head element has a recording part having a magnetic pole material of track width 0.5 μm formed using FIB (focused ion beam) processing from Ni45-Fe55 having a saturation magnetic flux density of 1.5T and having a recording gap length of 0.25 μm (gap material: Al$_2$O$_3$), and a playback part having a structure in which a giant magneto-resistive effect element is sandwiched between 2 μm Ni80-Fe20 shield films (shield spacing: 0.2 μm, gap material: Al$_2$O$_3$), wherein the giant magneto-resistive effect element is produced by laminating NiFe/Co (4 nm), Cu (2.5 nm), a fixed CoFe layer (3 nm) and CrMnPt (20 nm) in order, next carrying out rectangular patterning, then disposing a Co80-Cr15-Pt5 (10 nm)/Cr (10 nm) permanent magnet and a Ta electrode film (100 nm) at each end, and then using KrF stepper lithography to make the track width 0.4 μm as stipulated using an electrode.

Figure 9:
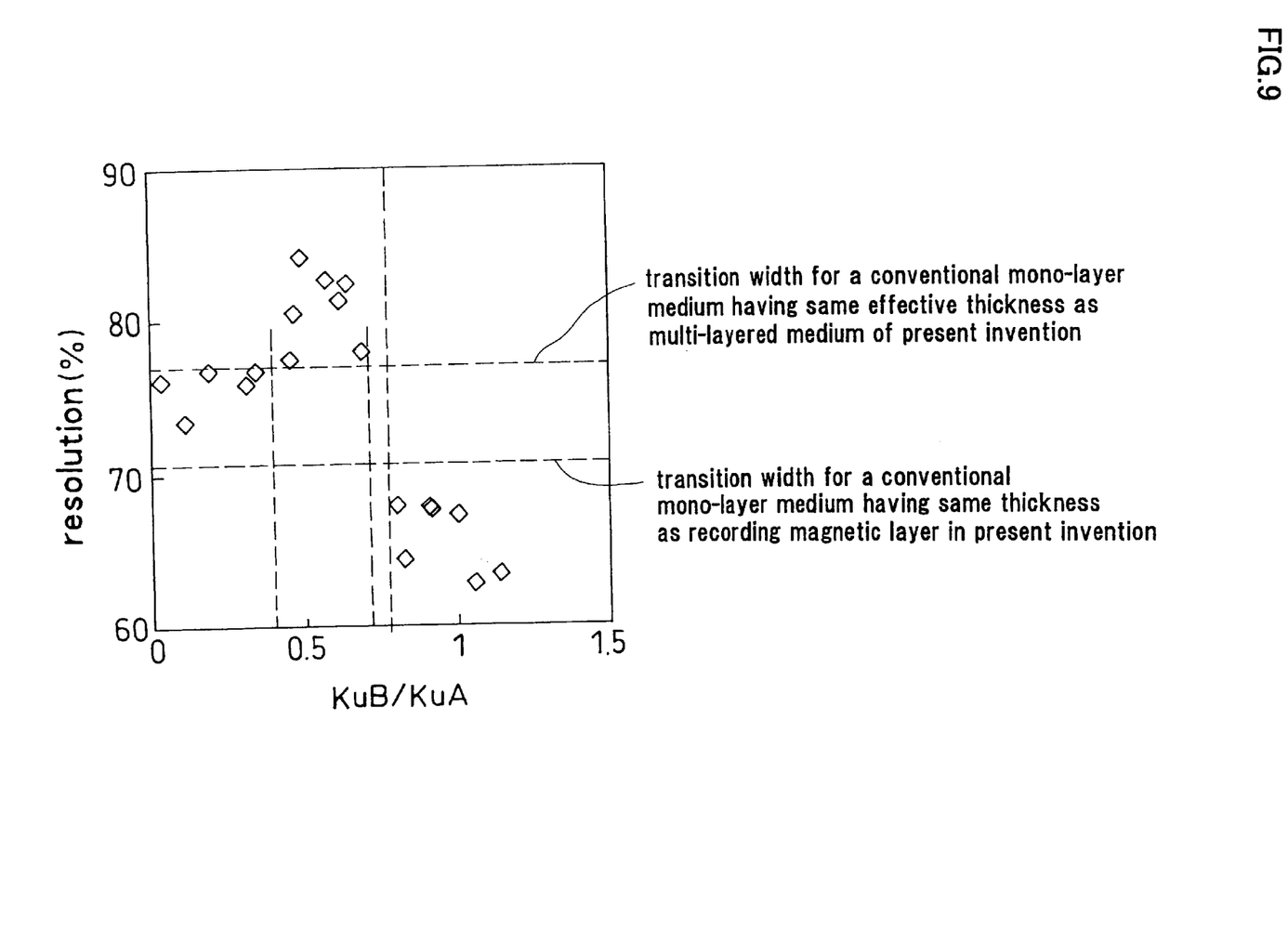
FIG. 9 is a principal diagram showing other effects of the present invention.

A relationship as shown in FIG. 9 was obtained between the resolution, which is the ratio of the 450 kFCI playback output to the isolated transition output, and the ratio KuB/KuA of the magnetic anisotropy energy KuB of the magnetic underlayer to the magnetic anisotropy energy KuA of the recording magnetic layer. If the ratio KuB/KuA is greater than 0.7, then the resolution is worse than that of a conventional medium having a recording magnetic layer as the only magnetic layer. If the ratio KuB/KuA is between 0.4 and 0.65, then a resolution on a par with that of a conventional medium having about the same effective thickness is obtained. The Kβ value of the AFC medium in this case can be made to be 30% or more greater than that of a conventional medium having about the same effective thickness. For a medium for which the reversal of the magnetization of the magnetic underlayer takes place at a negative magnetic field strength when the magnetization curve is measured at 135k, the resolution became less than 60%.

Figure 1:
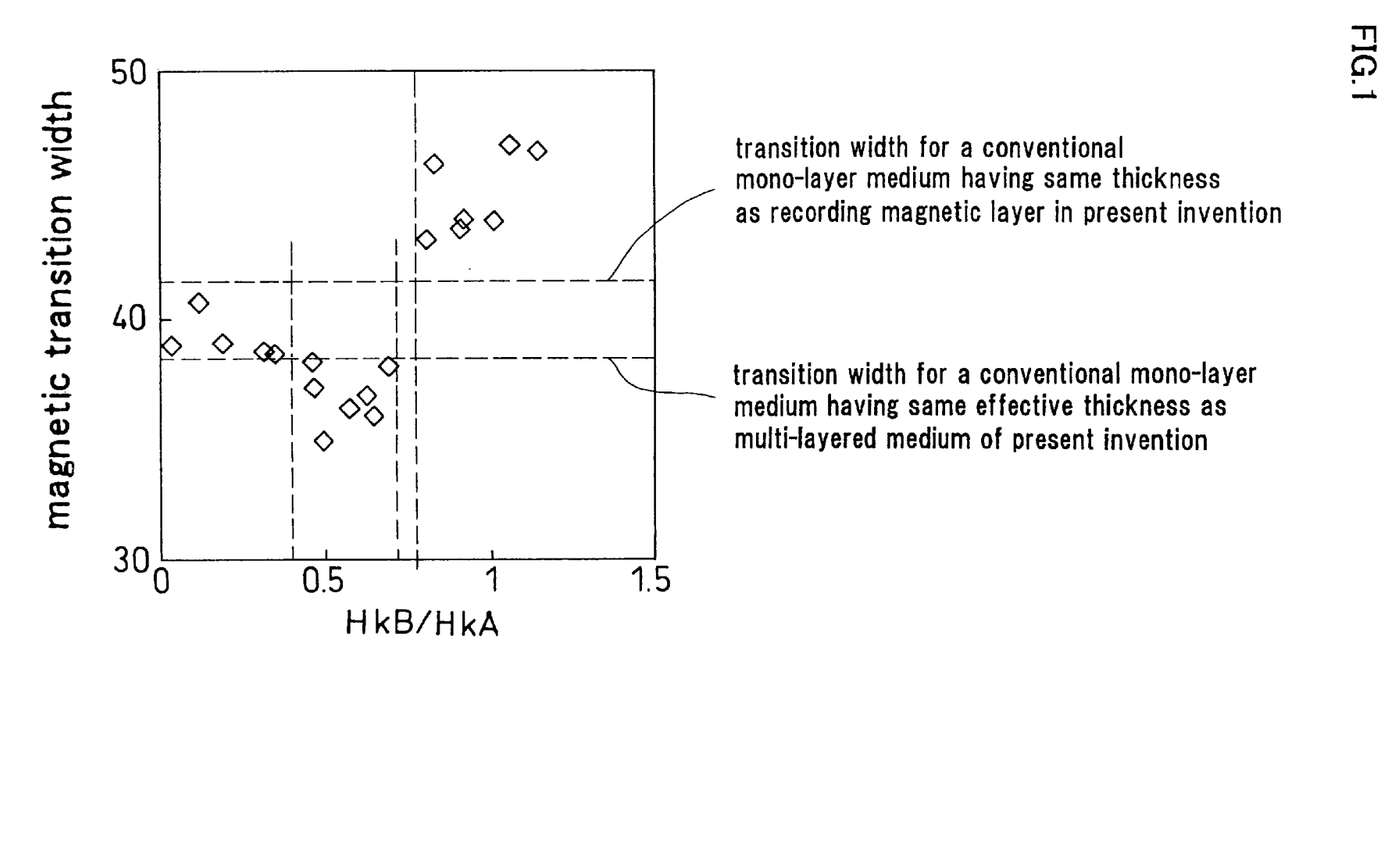
FIG. 1 is a principal diagram showing effects of the present invention.

Disks on which recording had been carried out were removed from the magnetic disk drive, and the magnetic transition width of an isolated transition was observed using a magnetic force microscope (MFM), whereupon it was found that the magnetic transition width changes in accordance with the ratio HkB/HkA of the anisotropic magnetic field strength HkB of the magnetic underlayer of the AFC medium to the anisotropic magnetic field strength HkA of the recording magnetic layer as shown in FIG. 1. Comparing with a mono-layer longitudinal medium, it is undesirable for the ratio HkB/HkA to exceed 0.7, since then the magnetic transition width becomes wider than that of a mono-layer longitudinal medium of thickness the same as that of the recording magnetic layer. Moreover, if the ratio HkB/HkA is between 0.4 and 0.65, then a magnetic transition width about as steep as that of a mono-layer longitudinal medium having the same effective thickness is obtained. When the magnetization curve was evaluated at 30k, for a case in which rearrangement takes place, the magnetic transition width again stayed at about the level for a conventional medium.

Note that the magnetic disk drive was such that minute projections were provided in 3 places on the slider to make the slider of negative pressure type, and a C—H protective overcoat was provided on the floating surface. FIG. 10(a) is a plan view of the drive, while FIG. 10(b) is a cross-sectional view. Prescribed electrical circuits the same as those used conventionally are needed for processing the playback signal and inputting and outputting information. Here, MEEPRML (modified EEPRML), which is EEPRML (extended extended partial response maximum likelihood) enhanced by strengthening the ECC function and is a signal processing circuit that actively utilizes waveform interference at high recording density, was used. Evaluation was also carried out using heads having conventional 1T (80Ni-20Fe), 1.3T (FeTaC), or 1.7T (FeNiN) recording magnetic poles, but in the case of 1T and 1.3T the overwrite characteristic was low at 20 dB, sufficiently steep recording could not be carried out, and noise was extremely high, making practical use infeasible; only in the case of 1.5T and 1.7T was good recording achieved. It can thus be seen that a value of at least 1.5T is required. Exactly the same kind of results were obtained when evaluation of properties was carried out using a tunnel type magnetic head of playback track width 0.4 μm made using the art disclosed in Japanese Patent Application Laid-open Nos. H2-148643 and H2-218904, but with a conventional MR head having the same track width a sufficient playback sensitivity could not be obtained and hence evaluation was not possible.

The embodiments described above are representative examples of the present invention, but other examples that a person skilled in the art could easily conceive of are also included in the scope of the present invention. For example, the same kind of effects could also be obtained using RF magnetron sputtering, ECR sputtering, helicon sputtering or the like. Moreover, through the magnetic recording medium disclosed in the present invention, recording and playback at a recording density of 15 Gb/in$^2$ or above becomes possible for the first time. Magnetic recording/playback devices using magnetic tapes, magnetic cards, optical magnetic disks and the like made possible by the magnetic recording medium of the present invention are thus also included in the scope of the present invention.

By using the magnetic recording medium and magnetic recording/playback device of the present invention, high-speed and high-capacity recording and playback becomes possible for the first time. As a result, magnetic recording/playback devices of extremely strong commercial competitiveness can be realized.

By using the magnetic recording medium and magnetic recording/playback device of the present invention, high-speed and high-capacity recording and playback can be realized.

What is claimed is:

1. A thin film magnetic recording medium, having:
    at least 2 magnetic layers formed on a non-magnetic substrate; and
    a non-magnetic intermediate layer that is interposed between said magnetic layers and causes magnetizations of said magnetic layers to be anti-parallel to one another;
    wherein a ratio HkB/HkA of an anisotropic magnetic field strength HkB of a magnetic layer on a side near to said substrate to an an isotropic magnetic field strength HkA of a magnetic layer on a side far from said substrate is 0.7 or less.

2. The magnetic recording medium according to claim 1, wherein said ratio HkB/HkA is at least 0.4 and not more than 0.65.

3. A thin film magnetic recording medium, having:
    at least 2 magnetic layers formed on a non-magnetic substrate; and
    a non-magnetic intermediate layer that is interposed between said magnetic layers and causes magnetizations of said magnetic layers to be anti-parallel to one another;
    wherein a ratio HkB/HkA of an anisotropic magnetic field strength HkB of a magnetic layer on a side near to said substrate to an anisotropic magnetic field strength HkA of a magnetic layer on a side far from said substrate is 0.7 or less, and
    wherein a ratio HcoB/HcoA of a coercivity HcoB of the magnetic layer B on the side near to said substrate at 0K as obtained by extrapolating values of coercivity at 200K and 100K to a coercivity HcoA of the magnetic layer A on the side far from said substrate at 0K as obtained by extrapolating values of coercivity at 200K and 100K is 0.7 or less.

4. The magnetic recording medium according to claim 3, wherein said ratio HcoB/HcoA is at least 0.4 and not more than 0.65.

5. A thin film magnetic recording medium, having:
    at least 2 magnetic layers formed on a non-magnetic substrate; and a non-magnetic intermediate layer that is interposed between said magnetic layers and causes magnetizations of said magnetic layers to be anti-parallel to one another;
    wherein a ratio HkB/HkA of an anisotropic magnetic field strength HkB of a magnetic layer on a side near to said substrate to an anisotropic magnetic field strength HkA of a magnetic layer on a side far from said substrate is 0.7 or less, and wherein a value (HcoA−HcoB)/(πa*dH/dx) is 0.8 or more, where HcoB is a coercivity of the magnetic layer B on the side near to said substrate at 0K as obtained by extrapolating values thereof at 200K and 100K, HcoA is a coercivity of the magnetic layer A on the side far from said substrate at 0K as obtained by extrapolating values thereof at 200K and 100K, dH/dx is a derivative in a track direction of a track direction component of a magnetic field from a magnetic recording head used together with said magnetic recording medium in a magnetic recording/playback device, taken in a position where said track direction component is HcoA in the center of the track and the center of the thickness direction of said magnetic layer A, and πa is a magnetic transition width of an isolated transition formed on said magnetic recording medium using said magnetic recording head.

6. The magnetic recording medium according to claim 5, wherein said value (HcoA−HcoB)/(πa*dH/dx) is at least 0.9 and not more than 1.5.

7. A thin film magnetic recording medium, having:
at least 2 magnetic layers formed on a non-magnetic substrate; and a non-magnetic intermediate layer that is interposed between said magnetic layers and causes magnetizations of said magnetic layers to be anti-parallel to one another;
wherein a ratio KuB/KuA of a magnetic anisotropy energy KuB of a magnetic layer on a side near to said substrate to a magnetic anisotropy energy KuA of a magnetic layer on a side far from said substrate is 0.7 or less.

8. The magnetic recording medium according to claim 7, wherein said ratio KuB/KuA is at least 0.4 and not more than 0.65.

9. A thin film magnetic recording medium, having:
at least 2 magnetic layers formed on a non-magnetic substrate; and
a non-magnetic intermediate layer that is interposed between said magnetic layers and causes magnetizations of said magnetic layers to be anti-parallel to one another;
wherein a ratio HkB/HkA of an anisotropic magnetic field strength HkB of a magnetic layer on a side near to said substrate to an anisotropic magnetic field strength HkA of a magnetic layer on a side far from said substrate is 0.7 or less, and
wherein during a process in which, at a temperature of 30K, a magnetic field is applied in a track direction to cause magnetic saturation, then the magnetic field is reduced at a rate of 3,000A/m per second, and then a magnetic field is applied in an opposite direction to cause magnetic saturation, the derivative of magnetization with respect to magnetic field strength has at least 2 peaks, and the magnetic field strengths giving said peaks are all in said direction of the last magnetic saturation.

10. The magnetic recording medium according to claim 9, wherein during a process in which, at a temperature of 135K, a magnetic field is applied in the track direction to cause magnetic saturation, then the magnetic field is reduced at a rate of 3,000A/m per second, and then a magnetic field is applied in the opposite direction to cause magnetic saturation, the derivative of magnetization with respect to magnetic field strength has at least 2 peaks, and at least one of the magnetic field strengths giving said peaks is in said direction of the last magnetic saturation.

11. A thin film magnetic recording medium, having:
at least 2 magnetic layers formed on a non-magnetic substrate; and
a non-magnetic intermediate layer that is interposed between said magnetic layers and causes magnetizations of said magnetic layers to be anti-parallel to one another;
wherein a ratio HkB/HkA of an anisotropic magnetic field strength HkB of a magnetic layer on a side near to said substrate to an anisotropic magnetic field strength HkA of a magnetic layer on a side far from said substrate is 0.7 or less, and
wherein said magnetic recording medium comprises at least 2 magnetic layers formed on a non-magnetic substrate; and a non-magnetic intermediate layer that is interposed between said magnetic layers and causes magnetizations of said magnetic layers to be anti-parallel to one another, and wherein a saturation magnetization of said magnetic layer on a side near to said substrate is larger than a saturation magnetization of said magnetic layer on a side far from said substrate.

12. The magnetic recording medium according to claim 1, wherein said magnetic layer on a side near to said substrate comprises either Co, or an alloy having Co as a principal component and also containing at least one element selected from Fe, Ni, Cr, Ta, Pt and Pd, and also B (boron).

13. The magnetic recording medium according to claim 1, wherein said non-magnetic intermediate layer comprises an alloy containing at least 50 at % of at least one metallic element selected from the group consisting of Ru, Ir, Rh, Re, Cu, Cr and Al, or an alloy containing a total of at least 50 at % of at least one element selected from Ru, Ir and Rh and at least one element selected from Pt and Pd.

14. The magnetic recording medium according to claim 13, wherein said non-magnetic intermediate layer is formed using an RF sputtering method.

15. The magnetic recording medium according to claim 1, wherein said magnetic layer on a side far from said substrate comprises a crystalline magnetic material containing at least 50 at % of at least one metallic element selected from the group consisting of Co, Fe and Ni, and said magnetic layer on a side near to said substrate is formed on a non-magnetic ground layer containing at least 50 at % of at least one element selected from the group consisting of Cr, Mo, W, Ta, V, Nb, Ti, Ge, Si, Co and Ni.

16. A magnetic storage device that carries out playback of magnetic information, and which combines the magnetic recording medium according to claim 1 and a magnetic head having a playback element that uses a giant magneto-resistive effect element or a tunnel-coupled film exhibiting a magneto-resistive effect and has an effective track width of 0.5 μm or less.

17. The magnetic recording medium according to claim 5, having a recording unit which employs a head in which magnetic poles having a saturation magnetic flux density of at least 1.8T are used.

* * * * *